United States Patent
Jeyachandran

(10) Patent No.: US 9,565,234 B1
(45) Date of Patent: Feb. 7, 2017

(54) CONTENT REQUEST IDENTIFICATION VIA A COMPUTER NETWORK

(71) Applicant: Google Inc., Mountain View, CA (US)

(72) Inventor: Sridher Jeyachandran, Mountain View, CA (US)

(73) Assignee: Google Inc., Mountain View, CA (US)

( * ) Notice: Subject to any disclaimer, the term of this patent is extended or adjusted under 35 U.S.C. 154(b) by 525 days.

(21) Appl. No.: 14/014,820

(22) Filed: Aug. 30, 2013

(51) Int. Cl.
*H04L 29/08* (2006.01)

(52) U.S. Cl.
CPC ..................... *H04L 67/02* (2013.01)

(58) Field of Classification Search
CPC . H04L 67/02; G06Q 30/0251; G06Q 30/0277; G06Q 30/0257; G06F 17/30286
See application file for complete search history.

(56) References Cited

U.S. PATENT DOCUMENTS

| | | | | |
|---|---|---|---|---|
| 2008/0287150 A1* | 11/2008 | Jiang | ................. | G06Q 30/0277 455/466 |
| 2010/0153215 A1 | 6/2010 | Abraham | | |
| 2010/0257050 A1 | 10/2010 | Lee | | |
| 2011/0270685 A1 | 11/2011 | Marks et al. | | |
| 2012/0066212 A1* | 3/2012 | Jennings | ........... | G06F 17/30144 707/723 |
| 2013/0054366 A1 | 2/2013 | Roundtree et al. | | |
| 2014/0207583 A1* | 7/2014 | Fujiwara | ............ | G06Q 30/0251 705/14.69 |

OTHER PUBLICATIONS

GoogleGuide, http://www.googleguide.com/category/query-input/, Jan. 4, 2007, pp. 1-6.*

* cited by examiner

*Primary Examiner* — John Macilwinen
*Assistant Examiner* — Christopher Cadorna
(74) *Attorney, Agent, or Firm* — Foley & Lardner LLP; John D. Lanza

(57) ABSTRACT

Systems and methods of providing information via a computer network are provided. A data processing system can obtain, via the computer network, a query including an interest identifier provided to a content publisher computing device by an end user computing device during a communication session between the content publisher computing device and the end user computing device via the computer network. The data processing system can identify an affirmative request for content based on the interest identifier, and can select a content item responsive to the affirmative request for content, the content item having subject matter satisfying the query. The data processing system can provide, via the computer network, the content item for display by at least one of the end user computing device and a third party computing device.

15 Claims, 6 Drawing Sheets

CONTENT REQUEST IDENTIFICATION VIA A COMPUTER NETWORK

BACKGROUND

In a computer networked environment such as the internet, entities such as people or companies provide information for public display on documents such as web pages. The documents can include information provided by the entities via a computing device for display on the internet. Content can also be provided by third parties for display on the documents together with the information provided by the entities. Thus, a person viewing a document can access the information that is the subject of the document, as well as third party content that may or may not be related to the subject matter of the document.

SUMMARY

At least one aspect is directed to a computer implemented method of providing information via a computer network. The method includes obtaining, by a data processing system via the computer network, a query including an interest identifier. The query can be provided to a content publisher computing device by an end user computing device during a communication session between the content publisher computing device and the end user computing device via the computer network. The method can include identifying, by the data processing system, an affirmative request for content based on the interest identifier, and selecting, by the data processing system, a content item associated with a content provider computing device responsive to the affirmative request for content. The content item can include subject matter satisfying the query. The method can include providing, via the computer network, the content item for display by at least one of the end user computing device and a third party computing device.

At least one aspect is directed to a system of providing information via a computer network. The system can include one or more data processors, and one or more storage devices storing instructions that when executed by the one or more data processors, cause the one or more data processors to perform operations. The operations can include obtaining, via the computer network, a query including an interest identifier provided to a content publisher computing device by an end user computing device during a communication session between the content publisher computing device and the end user computing device via the computer network. The operations can include identifying an affirmative request for content based on the interest identifier, and selecting a content item associated with a content provider computing device responsive to the affirmative request for content. The content item can have subject matter satisfying the query. The operations can include providing, via the computer network, the content item for display by at least one of the end user computing device and a third party computing device.

At least one aspect is directed to a computer readable storage medium device storing instructions that when executed by one or more data processors, cause the one or more data processors to perform operations. The operations can include obtaining a query including an interest identifier provided to a content publisher computing device by an end user computing device during a communication session between a content publisher computing device and the end user computing device via a computer network. The operations can include identifying an affirmative request for content based on the interest identifier, and selecting a content item associated with a content provider computing device responsive to the affirmative request for content. The content item can have subject matter satisfying the query. The operations can include providing, via the computer network, the content item for display by at least one of the end user computing device and a third party computing device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
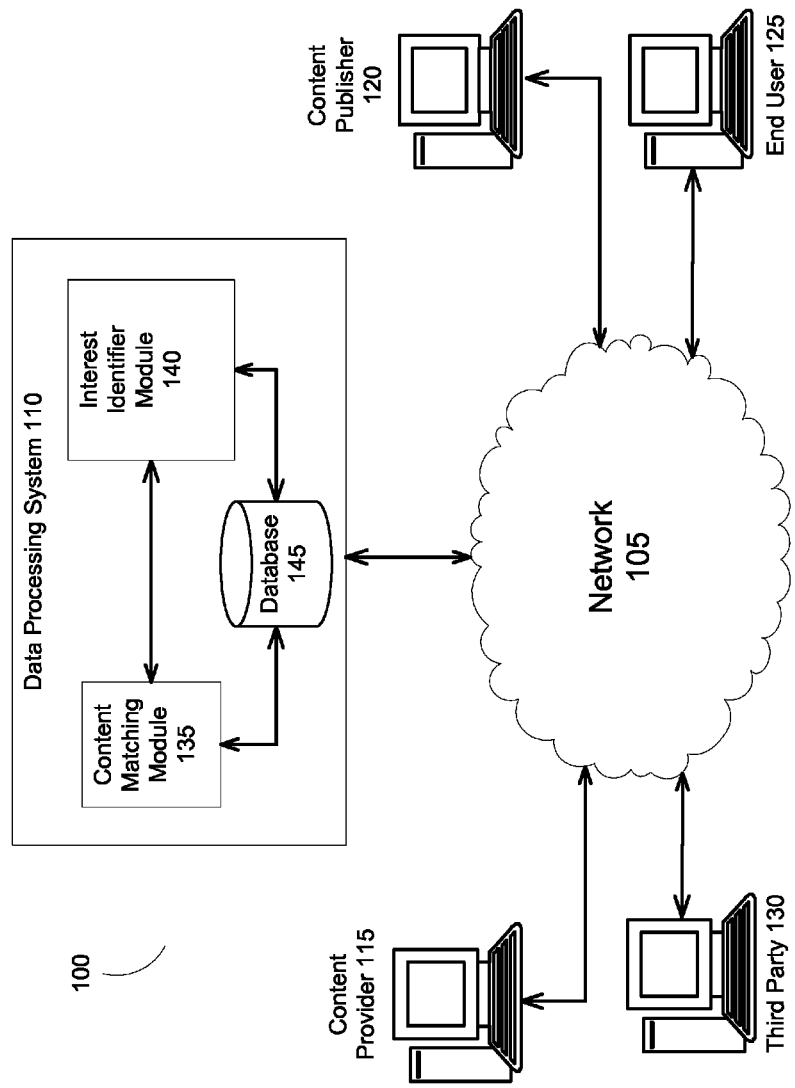
FIG. 1 is a block diagram depicting one example environment to provide information via a computer network, according to an illustrative implementation.

Following below are more detailed descriptions of various concepts related to, and implementations of, methods, apparatuses, and systems of providing information via a computer network. The various concepts introduced above and discussed in greater detail below may be implemented in any of numerous ways, as the described concepts are not limited to any particular manner of implementation.

Systems and methods of the present disclosure relate generally to obtaining an affirmative request from an end user to receive content items (e.g., ads) having specified subject matter. For example, the end user (via the end user computing device) can enter a query (e.g., a string of terms or a post) into a web page interface operated by a content publisher computing device such as a web page server. This may include, for example, a query entered into a search engine web page or a post to a social network web page. This query can include terms of the query as well as at least one interest identifier. The interest identifier can include at least one character or symbol (e.g., "$" "#" "*" or other character). For example, the query may be a social network post to third parties such as "Shall we meet at a $restaurant in Palo Alto this Saturday?" In this example, the "$" appended to the word "restaurant" is an interest identifier, and the remainder of the query includes the words (e.g., terms) "Shall we meet at a restaurant in Palo Alto this Saturday?"

A data processing system (e.g., an ad placement server) can obtain the query including the interest identifier from the content publisher computing device (or from the end user computing device). From the interest identifier, the data processing system can identify an affirmative request (e.g., a solicitation) from the user computing device for content items such as ads that are responsive to the terms of the query. For example, the data processing system can determine from the interest identifier "$" that a user of the end user computing device is affirmatively soliciting advertisements or other information about restaurants in Palo Alto this Saturday.

Responsive to this affirmative request for content, the data processing system can identify content items, such as ads associated with a content provider computing device that are part of an online ad campaign. The data processing system can determine that the content items are responsive to the affirmative request for content. For example, the data processing system can match terms of the query (e.g. "restaurant" or "Palo Alto") with subject matter of the content items. Based on this match, the data processing system can select a content item (e.g., an ad for a restaurant in or near the town of Palo Alto) from a database or from the content provider computing device and can provide the content item, via the computer network, for display by the end user computing device or by a third party computing device.

The data processing system can also provide content items selected responsive to the affirmative request for content for display by computing devices other than the end user computing device that originated the query. For example, the end user computing device can post the query "Shall we meet at a $restaurant in Palo Alto this Saturday?" on a web page of a social network or chat room where it is viewable via third party computing devices. In this example, the same or different content items responsive to the affirmative request for content (e.g., as indicated by the interest identifier "$") can be provided for display by third party computing devices that have viewed the query, or that have access to the query via the social network.

Thus, rather than infer user interest in receiving content items based on computing device activity and selecting content items based on this inference, the data processing system can obtain a direct affirmative request (e.g., an active solicitation) for content items responsive to terms of a query, based on an interest identifier that is part of that query. Responsive to the affirmative request, the data processing system can identify content items having subject matter related to at least portions of the query, and can provide the content items for display by the computing device that originates the query as well as by third party computing devices.

FIG. 1 illustrates an example system 100 for providing information via at least one computer network, such as the network 105. The network 105 can include computer networks such as the internet, local, wide, metro or other area networks, intranets, satellite networks, other computer networks such as voice or data mobile phone communication networks, and combinations thereof. The system 100 can also include at least one data processing system 110, e.g., at least one logic device such as a computing device or server having a processor to communicate via the network 105, for example with at least one content provider computing device 115, at least one content publisher computing device 120, at least one end user computing device 125, or at least one third party computing device 130.

The data processing system 110 can include at least one server. For example, the data processing system 110 can include a plurality of servers located in at least one data center or server farm. In one implementation, the data processing system 110 includes a content placement system, e.g., an ad server or ad placement system. For example, the data processing system 110 can include at least one content matching module 135, at least one interest identifier module 140, and at least one database 145. The content matching module 135 and the interest identifier module 140 can each include at least one processing unit, server, circuit, engine, or other logic device such as programmable logic arrays configured to communicate with the database 145 and with other computing devices (e.g., the content provider computing device 115, the content publisher computing device 120, the end user computing device 125, or the third party computing device 130) via the network 105. The content matching module 135 and the interest identifier module 140 can include at least one computer program or at least one script. The content matching module 135 and the interest identifier module 140 can be separate components, a single component, or part of the data processing system 110. The content matching module 135 and the interest identifier module 140 can include combinations of software and hardware, such as one or more processors configured to execute one or more scripts to detect or evaluate interest identifiers and to identify content based on and responsive to interest identifier.

The content provider computing devices 115 can include servers or other computing devices operated by a content provider entity to provide content items such as advertisements for display on information resources at the end user computing device 125 or the third party computing devices 130. The content provided by the content provider computing device 115 can include third party content items (e.g., ads) for display on information resources such as a web page that includes primary content, e.g. content provided by the content publisher computing device 120. The content items can also be displayed on a search results web page. For example, the content provider computing device 115 can provide or be the source of ads or other content items for display in content slots of content web pages such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other end user computing device 125 or third party computing device 130.

The content publisher computing devices 120 can include servers or other computing devices operated by a content publishing entity to provide primary content for display via the network 105. For example, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing device 115. For example, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115.

The end user computing devices 125 and the third party computing devices 130 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The end user computing device 125 and the third party computing device 130 can include desktop computers, laptop computers, tablet computers, smartphones, personal digital assistants, mobile devices, end user computing devices, consumer computing device, and other computing devices. The end user computing device 125 and the third party computing device 130 can include user interfaces such as microphones, speakers, touchscreens, keyboards, pointing devices, a computer mouse, touchpad, or other input or output interfaces.

The data processing system 110 can include the content matching module 135 and the interest identifier module 140 as part of one or more servers of a content placement system to identify affirmative requests for content originating from the end user computing device 125 and to identify content items as candidates for display at the end user computing device 125 or the third party computing device 130 responsive to the affirmative requests. For example, the interest identifier module 140 can be part of, or can include scripts executed by, one or more servers in a content placement system configured to determine affirmative requests for content originating from the end user computing device 125 based on interest identifiers included with queries (e.g., search queries or social network posts) made from the end user computing device 125. The interest identifiers can be affirmatively provided by a user of the end user computing device 125 together with a query as an explicit request made by the user to receive content items at the end user computing device 125 responsive to the query.

The content matching module 135 can be part of the same or a different server as the interest identifier module 140 in the data processing system 110, e.g., a content placement system. The content matching module 135 can evaluate terms of a query that includes an interest identifier to identify or select a content item for use in a network 105 based content item placement campaign operated by the data processing system 110 for the content provider associated with the content provider computing device 115. For example, the content matching module 135 can identify keywords from terms of the query that includes the interest identifier and can match the keywords with subject matter of or associated with a content item, such as content of an ad or associated metadata. The data processing system 110 can provide the selected content item for display by the end user computing device 125 or the third party computing device 130 responsive to the query.

Figure 2:
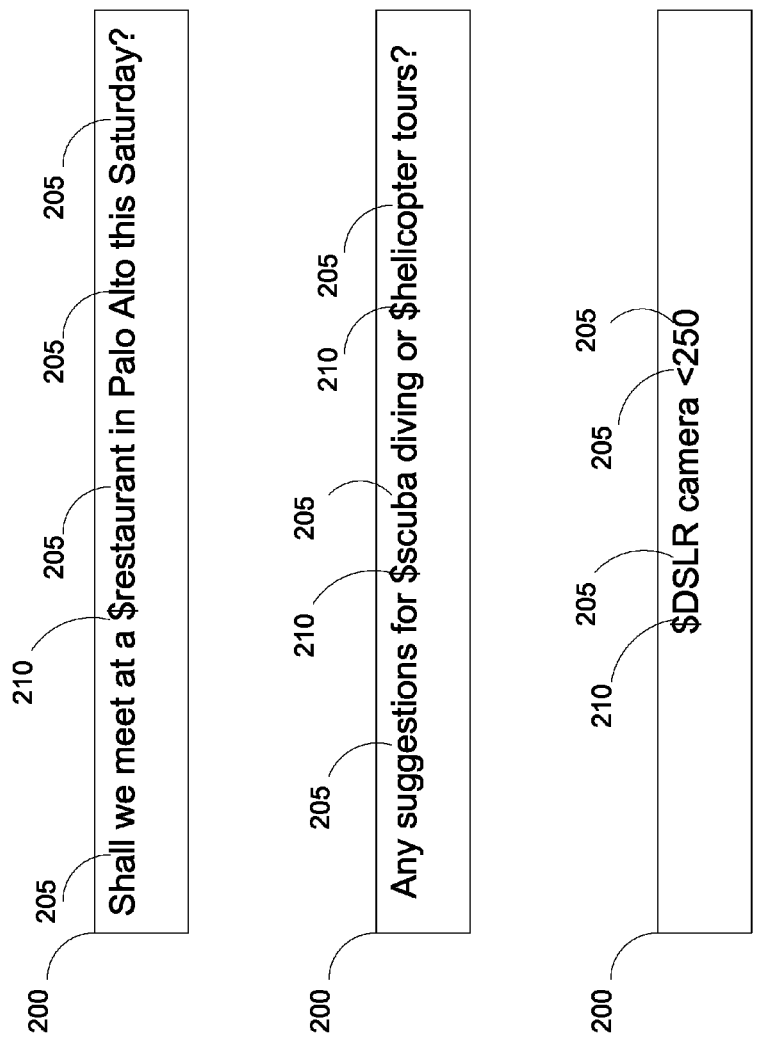
FIG. 2 is a display depicting queries, according to an illustrative implementation.

FIG. 2 illustrates an example of queries 200. The query 200 can include at least one term 205 and at least one interest identifier 210. For example, the query 200 "Shall we meet at a $restaurant in Palo Alto this Saturday?" includes the terms 205 "shall" "we" "meet" "at" "a" "restaurant" "in" "Palo" "Alto" "this" and "Saturday", and this example query 200 includes the interest identifier 210 "$". In another example, the query 200 "Any suggestions for $scuba diving or helicopter tours?" includes the terms 205 "any" "suggestions" "for" "scuba" "diving" "or" "helicopter" and "tours" and the interest identifier 210 "$". In another example, the query 200 "$DSLR camera <250" includes the terms 205 "DSLR" "camera" "<" and "250" and the interest identifier 210 "$". In the examples of FIG. 2, not every term 205 is labeled for ease of illustration.

The query 200 can include one or more words, symbols, phrases, or sentences such as terms 205 or interest identifiers 210. The query 200 can include or indicate a question, need, or request for information, for example. The terms 205 can include one or more words, phrases, or abbreviations. The terms 205 can be evaluated by the data processing system 110 as keywords used by the data processing system 110 to identify content items.

The interest identifiers 210 include characters or symbols, such as "$" "^" "*" "§" "{" "}" "(" ")" "¶" "#" or "@", for example. In one implementation, the interest identifier 210 is not a word. For example, the interest identifier 210 can include at least one character appended to one of the terms 205 of the query 200. The interest identifier 210 can also be a text character included with the query 200 or a symbol included with the query 200. The interest identifier 210 is not a personalized identifier and does not personally identify the end user. Rather, the interest identifier 210 indicates that the end user associated with the end user computing device 125 is seeking information responsive to the query 200 and that the end user solicits use of the terms 205 of the query 200 for the purposes of identifying relevant content items. Thus, the end user computing device 125 communicates the affirmative interest of an end user for content items responsive to a particular query 200.

In some implementations, the interest identifiers 210 constitute affirmative requests or solicitations for content, such as an affirmative request for the data processing system 110 to provide content items such as ads or other content having subject matter similar to or responsive to subject matter indicated by the terms 205. In one implementation, interest identifiers 210 that are symbols do not have the ordinarily recognized meaning of that symbol. The interest identifier "$" can be unrelated to money or financial information. For example, in the query 200 "Shall we meet at a $restaurant in Palo Alto this Saturday?" the interest identifier 210 "$" can indicate a request for content related to the terms 205 of the query 200, irrespective of financial limitations. In one implementation, the query 200 consists exclusively of terms 205 and interest identifiers 210. The data processing system 110 can identify the affirmative request for content based exclusively on the interest identifier 210. In this example, the data processing system 110 does not infer any user interest in receiving content items based on the terms 205 of the query 200 or any other end user computing device 125 activity. In this example, the sole criterion for determining that the end user associated with the end user computing device 125 consents to receive content items is the interest identifier 210.

The query 200 can be entered into an online document such as a web page operated by the content publisher computing device 120. For example, via the end user computing device 125, an end user (e.g., a person) can type, speak, or select the query 200 for entry into an interface of a web page, such as a text entry box. The query 200 can be all or part of a post provided for display by a social network or chat room. The query 200 can be entered into an online search engine. For example, the content publisher computing device 120 can include a search engine and provide a search engine input interface (e.g., a text box) where the query 200 "$DSLR camera <250" is entered into the search engine to request content (e.g., content items or ads) related to a DSLR (digital single-lens reflex) camera that costs less than $250. In this example, the character "<" is identified and evaluated by the data processing system 110 as a term 205 and the character "$" is identified and evaluated by the data processing system 110 as an interest identifier 210. In one voice entry example, an end user at the end user computing device 125 having voice recognition capabilities can speak the query 200 having the interest identifier 210 into a speaker of the end user computing device 125. Example queries 200 may be "I am thinking of buying a digital camera before my long weekend trip" or "I would like to buy a digital camera." The interest identifier module 140 can determine that that query 200 includes an interest identifier 210 based on the query 200, such as the interest identifier 210 "thinking of buying" or the interest identifier 210 "would like to buy."

In one implementation, the data processing system 110 obtains at least one query 200. For example, the data processing system 110 can receive the query 200 via the computer network 105 from the content publisher computing device 120 or from the end user computing device 125. The query 200 can include at least one term 205 and at least one interest identifier 210. The data processing system 110 can obtain the query 200, where the query 200 was generated during a communication session between the end user computing device 125 and the content publisher computing device 120. For example, the end user computing device 125 can communicate with the content publisher computing device 120, via the computer network 105, to access a web page or other online document or information resource for display of the web page by the end user computing device 125. An end user associated with the end user computing device 125 can enter the query 200 into an interface of the web page. In this example, the end user computing device 125 or the content publisher computing device 120 can transmit the query 200, generated by the end user computing device 125 responsive to end use input, to the data processing system 110 via the computer network 105. The query 200 can be obtained by the data processing system 110 during or subsequent to the communication session.

In one implementation, the data processing system 110 obtains the query 200 subsequent to termination of the communication session between the content publisher computing device 120 and the end user computing device 125, where the query 200 was generated by the end user computing device 125 during the communication session.

The data processing system 110 can identify an affirmative request for content from the query 200. For example, a component of the data processing system 110 such as the interest identifier module 140 can detect the interest identifier 210 from the query 200 and can determine that the interest identifier constitutes an affirmative request by the end user for content items such as ads that are responsive to the query 200. The interest identifier module 140 can receive and parse the query 200 to identify the interest identifiers 210. In one implementation, the interest identifier module 140 accesses a listing of interest identifiers 210, for example from the database 145, and can determine that at least one of the interest identifiers 210 is present in the query 200. In some implementations, the end user computing device 125 and the interest identifier module 140 communicate via the network 105 using a predefined format or protocol, such as an extensible markup language (XML) format, to represent interest identifiers 210. For example, an XML query may be:

<UserQuery>
<Text>Shall we meet at a $restaurant in Palo Alto</Text>
<InterestIdentifier>restaurant</InterestIdentifier>
<Context>
<OtherPreferences>Vegan</OtherPreferences>
. . .
</Context>
</UserQuery>

In some implementations, the end user computing device 125 displays a prompt to the end user that includes a listing of one or more interest identifiers for the end user to select and add to the query during query generation. In one implementation, during or upon completion of query generation by the end user computing device 125, the end user can receive a prompt in the form of an explicit offer or question, such as "would you like to receive ads or third party content responsive to this query?". In this example, the end user computing device can add the interest identifier 210 to the query 200 responsive to an affirmative response to this prompt. The data processing system 110 can provide the prompt for display by the end user computing device 125 during entry of the query 200 into an interface of an online document. The prompt can include the interest identifier 210 for end user selection and insertion into the query 200. In one implementation, the prompt is displayed in the form of an autocomplete option displayed by the end user computing device 125. The autocomplete option can include a highlighting, color coding, pop up window, or tutorial that describes the purpose of the interest identifier 210 as an indication that the end user affirmatively requests content items responsive to the query 200.

In some implementations, responsive to the affirmative request for content indicated by the interest identifier 210, the data processing system 110 can select at least one content item having subject matter that satisfies the query 200. For example, from the query 200 "Shall we meet at a *restaurant* in Palo Alto this Saturday?" the interest identifier module 210 can identify the interest identifiers 210 "*". The data processing system 110 can determine that the interest identifiers 210 "*" constitute an affirmative request for content. Responsive to the affirmative request for content, the content matching module 135 can select at least one content item that satisfies (e.g., has a subject matter, geographic, or semantic relation to) the terms 205 of the query 200. In this example, the content matching module 135 can identify ads or other content items related to restaurants in or near the town of Palo Alto. The content items can be selected from at least one database 145 of the data processing system 110 or from databases associated with the content provider computing device 115. In some implementations, the selected content item is associated with the content provider computing device 115 or other third party content provider.

The subject matter of the content item can be based exclusively on the terms 205 of the query 200, the interest identifier 210 of the query 200, or both. For example, the content matching module 135 can evaluate only the query 200 and not evaluate other activity data to identify a content item responsive to the query.

In one implementation, data processing system 110 can determine criteria from the interest identifier 210, and can select content items that satisfy the criteria. The criteria can include geographic, time, cost or other constraints. For example, from the interest identifier 210, the interest identifier module 140 can determine one or more of a time criterion, a location criterion, or a cost criterion. The time criterion can indicate that the interest identifier 210 is an affirmative request for content only during an identified time period, such as within the next 8 hours, day, week, month, or other time period. After expiration of this time period, the data processing system 110 can determine that the query 200 no longer includes the interest identifier 210 or is no longer associated with an affirmative request for content. The location criterion can indicate geographic ranges or restrictions relative to the terms 205 of the query 200 or relative to another geographic location. The cost criterion can include a cost range, maximum, or minimum, such as a cost of a good or service indicated by a content item selected responsive to the query 200.

The query 200 can include a plurality of terms 205. In one implementation, a component of the data processing system 110 such as the interest identifier module 140 can determine that a subset of the terms 205 constitute the interest identifier 210, and that the remaining terms 205 of the query 200 (e.g., a second subset of terms 205) do not constitute the interest identifier. In this example, the first subset of the terms 205 is the interest identifier 210 that authorizes content item selection, and the content matching module 135 selects at least one content item based on the second subset of the terms 205.

The affirmative request for content can constitute an active solicitation or consent, from the end user, authorizing the data processing system 110 to identify content items (e.g., ads) responsive to the query 200 and to provide the content items via the network 105 for display at the end user computing device 125 or the third party computing device 130. In some implementations, in the absence of the affirmative request for content, the data processing system 110 does not evaluate the terms 205 of the query 200 to identify content items. For example, the data processing system 110 can obtain the query 200 and evaluate the query to determine the absence of an interest identifier. Responsive to the determined absence of the interest identifier, the data processing system 110 can determine not to provide content items for display by the end user computing device 125 or third party computing devices 130. For example, the data processing system 110 can prevent or block content items that are responsive to the query 200 from being provided for display. In some implementations, the data processing system 100 determines that the query 200 fails to include any interest identifiers 210, and responsive to this determination prevents transmission of content items responsive to the terms 205 of the query 200 for display or rendering by the end user computing device 125 or by the third party computing device 130.

The data processing system 110 can provide content items for display by the end user computing device 125 or by the third party computing device 130. For example, the data processing system 110 can include or be part of an ad or content item placement server that provides content items for display by computing devices via the network 105 as part of an online content item placement campaign. The data processing system 110 can instruct the content provider computing device 115 to provide content items via the network 105 for display by the end user computing device 125 or the third party content computing device 145. The data processing system 110 can also provide content items, via the network 105, to the end user computing device 125 or the third party computing device 130 directly (e.g., from the database 145 without retrieving content items from the content provider computing device 115). The data processing system 110 can provide content items for display by the end user computing device 125 during the same communication session between the end user computing device 125 and the content publisher computing device 120 associated with the generation of the query 200, or during a different, subsequent communication session between the end user computing device 125 and the same or a different content publisher computing device 120.

In some implementations, the data processing system 110 provides content items via the network 105 for display by the end user computing device 125 that generated the query 200. For example, the query 200 including terms 205 and the interest identifier 210 can be entered into a search engine web page. The data processing system 110 (or other search engine server) can perform a search responsive to the terms 205 of the search query. Based on the existence and detection of the interest identifier 210, the data processing system 110 can identify at least one content item and provide the content item for display by the end user computing device 125, for example in a content item slot of a search engine results landing page.

The data processing system 110 can also provide content items via the network 105 for display by the third party computing device 130 that did not generate the query 200. For example, the query 200 can be a post (or part of a post) entered into a web page of a social network website or online chat room. The third party computing devices 130 may have access to the post and to the query 200. For example, social network friends via third party computing devices 130 can view the post on the social network website. In this example, responsive to the detection of the interest identifier 210, the content matching module 135 can select a content item for display by the third party computing devices 130, within content items slots of the social network website or with other information resources such as other websites. The selected content items can be provided for display by only the end user computing device 125, only by the third party computing device 130, or by both the end user computing device 125 and the third party computing device 130.

In one implementation, the data processing system 110 can determine a number of third party computing devices 130 with access to the query 200 posted on the social network web page, and can select content items based in part on this information. For example, if 30 people view the query 200 in the form of a post "Shall we meet at a restaurant in Palo Alto this Saturday" with the interest indicator 210 removed, the content matching module 135 can select a content item for a restaurant in Palo Alto that can accommodate parties of 30 people. In some implementations, the content item selected by the data processing system 110 is customized based on the terms of the query 200. For example, a content item may include an ad offering a discount for a party of 30 at a restaurant in the city of Palo Alto for a specified Saturday night.

In one example, the query 200 "Any suggestions for $scuba diving or helicopter tours?" can be posted to a social network web page. In this example, responsive to identification of the interest identifier 210 "$", the data processing system 110 can communicate via the network 105 with at least one content provider computing device 115 to identify, select, or offer for the content provider computing device 115 to generate or create, a content item responsive to the query 200. The generated content item can be customized for the query 200.

In another example, the query 200 "$DSLR camera <250" can be provided to a search engine web page interface. The data processing system 110 can determine, from the existence of the interest identifier 210 "$" and the terms 205 of the query 200 that the end user affirmatively requests content items for display by the end user computing device 125 for digital cameras that cost less than 250 dollars. In this example, the interest identifier 210 "$" indicates an interest in receiving content items, and does not indicate cost. Rather, in this example, the terms 205 "<" and "250" indicate a cost limit of 250 dollars. In this example, the data processing system 110 can communicate via the network 105 with at least one content provider computing device 115 to identify, select, or offer for the content provider computing device 115 to generate or create, a content item responsive to the query 200, such as an ad for a digital camera that costs less than 250 dollars. This content item (e.g., the ad) can be provided to the end user computing device 125 responsive to the query 200 for display, for example in a content item slot of a web page.

Figure 3:
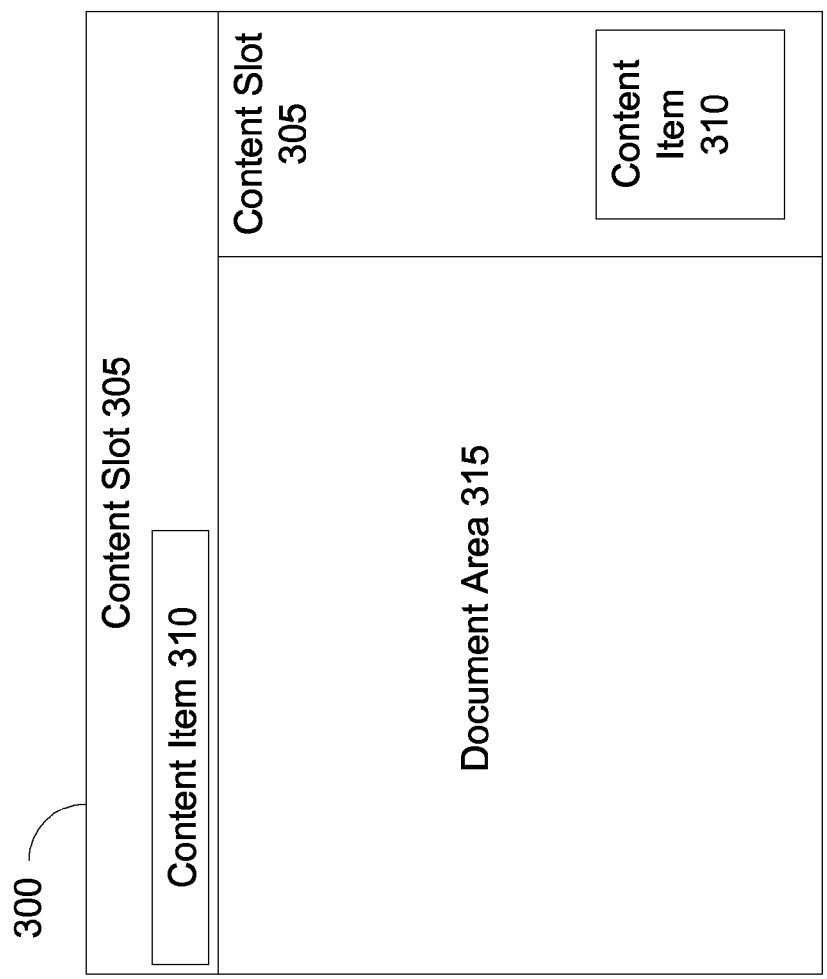
FIG. 3 is a display depicting an online document for display of content items, according to an illustrative implementation.

FIG. 3 depicts an example online document 300 including content item slots 305 for display of content items 310. For example, the online document 300 can include a web page associated with the content publisher computing device 120. The online document 300 can display first party content, such as subject matter of the web page, in the document area 315. The online document 300 can include at least one content item slot 305. The content item slot 305 can indicate areas of the online document 300 reserved for the display of ads of other third party content items 310. The content items slot 305 can be located in various areas of the online document 300, such as in a banner or headline position, running horizontally along the top of the online document 300, laterally in a vertical position alone the sides of the online document 300, at the bottom of the online document 300, or within the document area 315. Content items selected responsive to the affirmative request for content can be provided by the data processing system 110 for display in the content items slots 310. In one implementation, the online document 300 includes a social network web page, and the query 200 can be provided for display within the document area 315.

In one implementation, the data processing system 110 removes the interest identifier 210 from the query 200 and provides the query 200 for display without the interest identifier. For example, the query 200 "Shall we meet at a $restaurant in Palo Alto this Saturday?" posted to the online document 300 such as a social network web page is generated by the end user computing device 125 with "$" as the interest identifier 210. In this example, the data processing system 110 can remove the interest identifier 210 "$" from the query 200, so that the query 200 that is displayed on the social network web page (e.g., in the document area 315) is "Shall we meet at a restaurant in Palo Alto this Saturday?" and does not include the interest identifier 210 "$". The content matching module 135 can select content items 310 and provide them for display by the third party computing device 130 or the end user computing device 125, due to the existence of the interest identifier 210, without displaying the interest identifier 210 on the online document 300.

The data processing system 110 can include one or more data processors and one or more storage devices, such as the database 145. The storage devices can store instructions that, when executed by the one or more processors perform operations to provide information such as content items via the network 105 to computing devices, responsive to the query 200 including the interest identifier 210. For example, the one or more processors can communicate with the one or more storage devices to execute scripts or programs to obtain via the network 105, the query 200 and to identify the affirmative request for content based on the interest identifier 210. The one or more processors can communicate with the one or more storage devices to execute scripts or programs to select content items responsive to the affirmative request for content, based on the terms of the query and having subject matter satisfying the query, and can provide the content items for display by the end user computing device 125 or by the third party computing device 130, for example as part of an online content item placement campaign. In some implementations, the data processing system 110 provides the content items via email, a newsfeed, or text message for display by the end user computing device or by the third party computing device 130 when the end user accesses the email, news feed, or a text message display application.

The data processing system 110 can include a computer readable storage medium. The computer readable storage medium can store instructions that when executed by one or more data processors (e.g., of the data processing system 110) cause the one or more data processors to perform a series of operations to provide information such as content items via the network 105 to computing devices, responsive to the query 200 including the interest identifier 210. The operations can obtain via the network 105, the query 200 and identify the affirmative request for content based on the interest identifier 210. The operations can select content items responsive to the affirmative request for content, based on the terms of the query and having subject matter satisfying the query, and can provide the content items for display by the end user computing device 125 or by the third party computing device 130, for example as part of an online content item placement campaign. The computer readable medium can be non-transient.

Figure 4:
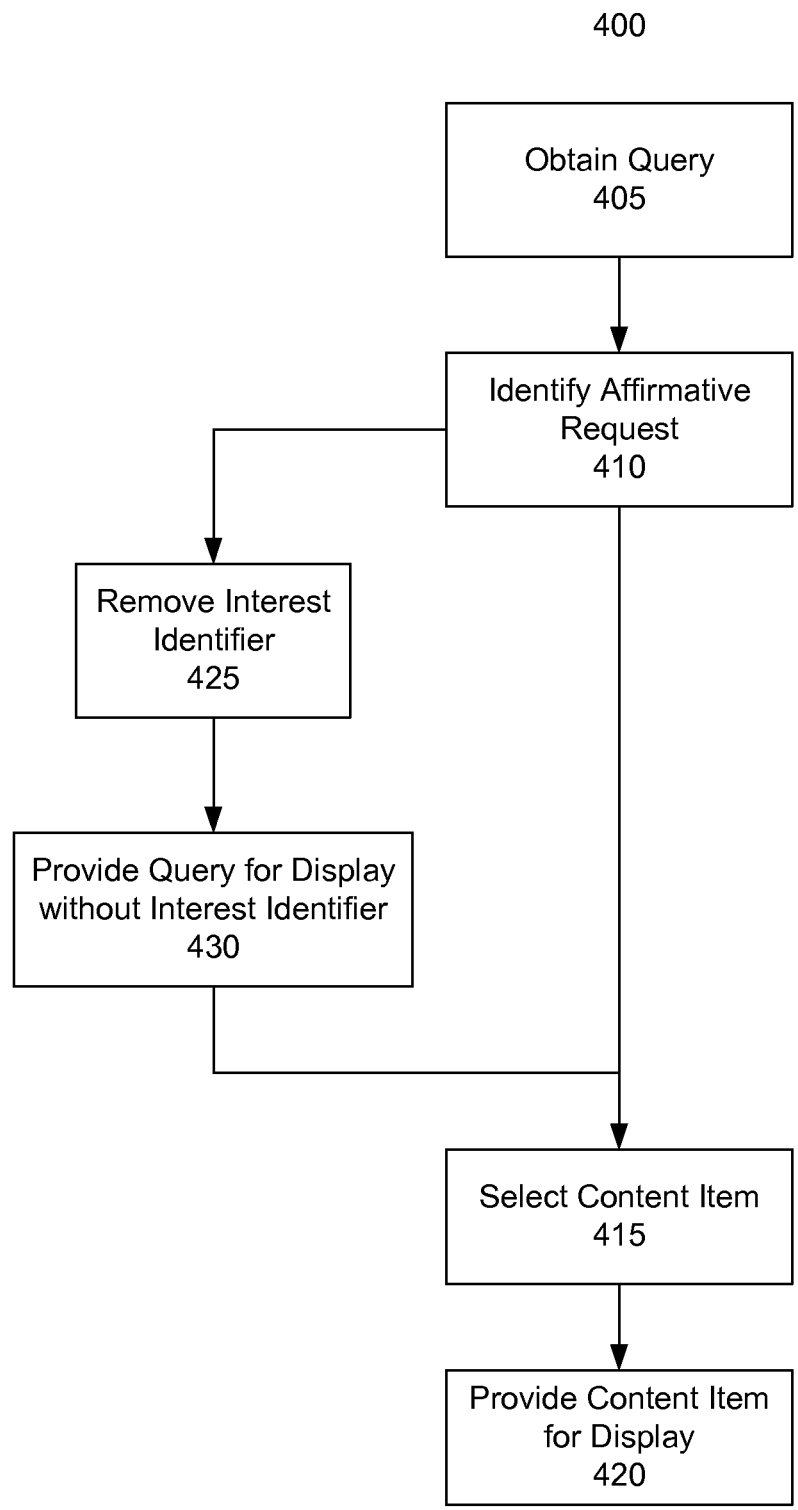
FIG. 4 is a flow diagram depicting a method of providing information via a computer network, according to an illustrative implementation.

FIG. 4 is a flow diagram depicting a method 400 of providing information via a computer network, according to an implementation. The method 400 includes an act of obtaining the query (ACT 405). For example, the data processing system 110 can obtain the query (ACT 405) via the computer network from the end user computing device 125 or the content publisher computing device 120. The query 200, which can include the terms 205 and the interest identifier 210, can be obtained (ACT 405) by the data processing system 110 during a communication session between the content publisher computing device 120 and the end user computing device 125, or subsequent to the communication session. For example, the query 200 can be obtained (ACT 205) from a post to a social network web page or an entry into a search engine web page.

The method 400 can include an act of identifying an affirmative request for content (ACT 410). For example, based on the interest identifier 210, the data processing system 110 can identify an affirmative request for content (ACT 410) associated with the query 200. Responsive to the affirmative request for content, the method 400 can include an act of selecting a content item (ACT 415). For example, the data processing system 110 can match keywords of content items with the terms 205 of the query 200 to determine that a content item satisfies the query, with the query including at least one interest identifier 210. The content item can include an ad associated with the content provider computing device 115.

The method 400 can include an act of providing the content item for display (ACT 420). For example, via the computer network 105, the data processing system 110 can provide, or instruct the content provider computing device to provide, at least one content item to the end user computing device 125 or to the third party computing device 130 for display (ACT 420), responsive to the query 200 that includes the interest identifier 210.

In some implementations, the method 400 includes an act of removing the interest identifier (ACT 425). For example, the data processing system 110 can receive the query 200, where the query 200 is part of a post to a social network web page. The data processing system 110 can remove the interest identifier 210 (ACT 425) from the query 200 so that the display of the query 200 with the social network web page post displays the query 200 and the terms 205, but does not display the interest identifier 210. The data processing system 110 can provide the query without the interest identifier to, for example, the content publisher computing device 120 for display without the interest identifier (ACT 430).

Figure 5:
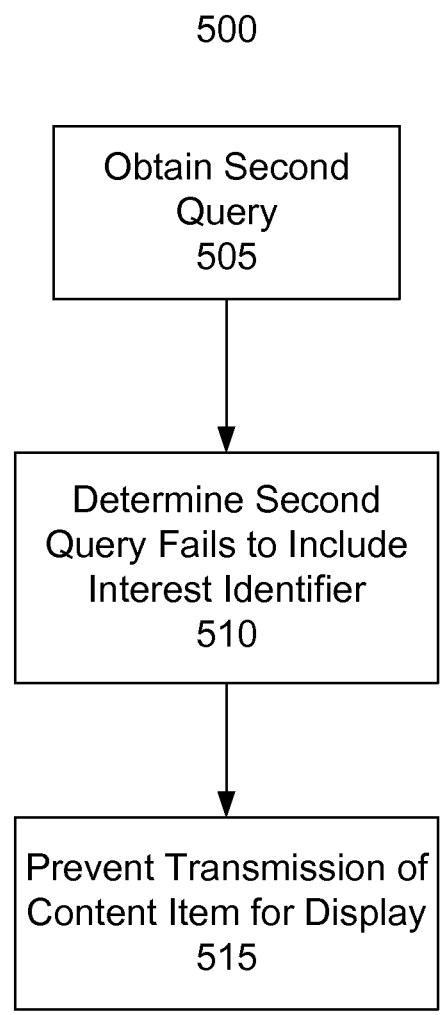
FIG. 5 is a flow diagram depicting a method of providing information via a computer network, according to an illustrative implementation.

FIG. 5 is a flow diagram depicting a method 500 of providing information via a computer network, according to an implementation. The method 500 can include an act of obtaining a second query 200 (ACT 505). For example the data processing system 110 can obtain the second query 200 via the network 105 from the end user computing device 125 or from the content publisher computing device 120. The method 500 can include an act of determining that the interest identifier 210 is absent from the query 200 (ACT 510). For example, the data processing system 110 can determine that the second query 200 fails to include the interest identifier 210 (ACT 510). For example, the interest identifier module 140 can access a listing of interest identifiers 210 from the database 145 and determine that the second query 200 does not include any of the interest identifiers 210 indicated by the listing.

The method 500 can include an act of preventing transmission of content items (ACT 515). For example, the data processing system 110 can prevent selection or identification of content items responsive to the terms 205 of the query 200 due to the absence of the interest identifier 210 from the query 200. In this example, the lack of the interest identifier 210 from the query 200 indicates that the end user associated with the end user computing device does not solicit content items, or does not consent to receive content items responsive to the query 200.

Figure 6:
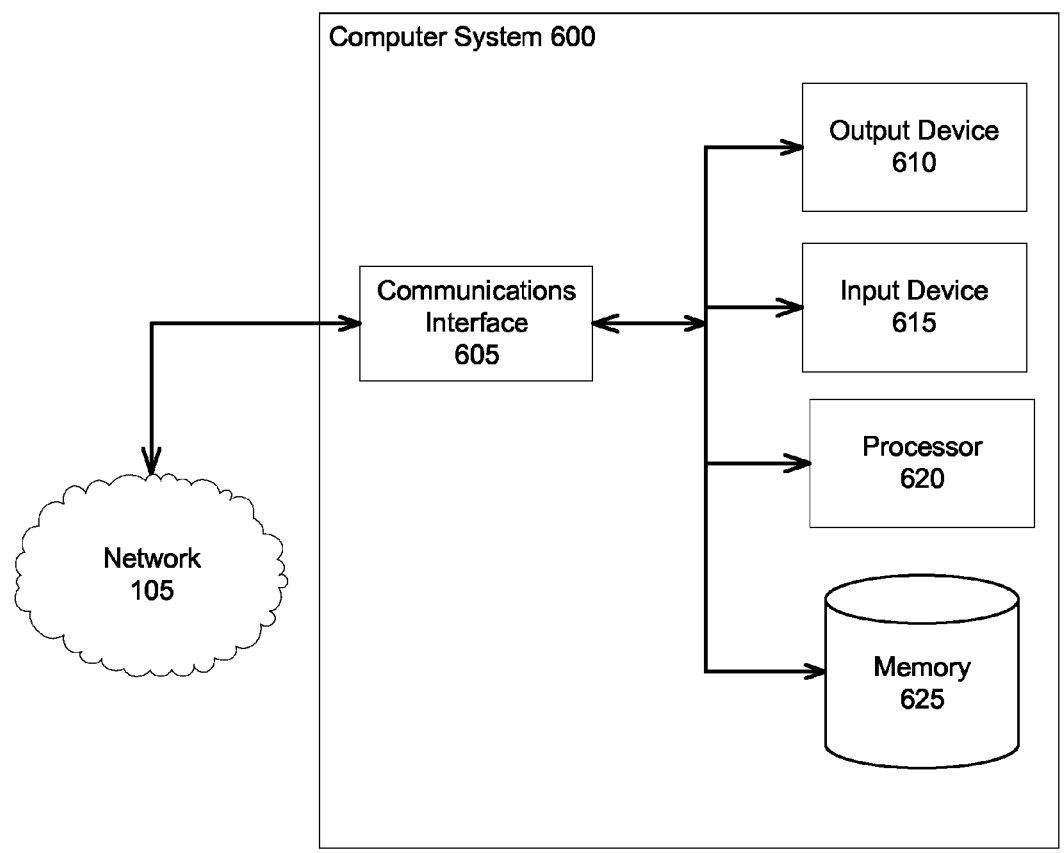
FIG. 6 is a block diagram illustrating a general architecture for a computer system that may be employed to implement elements of the systems and methods described and illustrated herein, according to an illustrative implementation.

FIG. 6 shows the general architecture of an illustrative computer system 600 that may be employed to implement any of the computer systems discussed herein (including the system 100 and its components such as the data processing system 110, the interest identifier module 140 or the content matching module 135) in accordance with some implementations. The computer system 600 can be used to provide information via the network 105, for example to select content items for display on the end user computing device 125 or the third party computing device 130 based at least in part on the query 200 and the components of the query such as the terms 205 and the interest identifier 210. The computer system 600 includes more processors 620 communicatively coupled to memory 625, one or more communications interfaces 605, and one or more output devices 610 (e.g., one or more display units) and one or more input devices 615. The processors 620 can be included in the data processing system 110 or the other components of the system 100 such as the interest identifier module 140 or the content matching module 135.

The memory 625 can include computer-readable storage media, and can store computer instructions such as processor-executable instructions for implementing the operations described herein. The interest identifier module 140, the content matching module 135, or the database 145 can include the memory 625 to store the query 200, the terms 205, the interest identifier 210, content items, information indicating the format of the content items, requests for content, or information indicating the input format of requests for content. The processor(s) 620 can execute instructions stored in the memory 625 and can read from or write to the memory information processed and or generated pursuant to execution of the instructions.

The processor 620 can be communicatively coupled to or control the communications interface(s) 605 to transmit or receive information pursuant to execution of instructions. For example, the communications interface(s) 605 can be coupled to a wired or wireless network, bus, or other communication means and can allow the computer system 600 to transmit information to or receive information from other devices (e.g., other computer systems). One or more communications interfaces 605 can facilitate information flow between the components of the system 100. In some implementations, the communications interface(s) can be configured (e.g., via hardware components or software components) to provide a website as an access portal to at least some aspects of the computer system 600. Examples of communications interfaces 605 include user interfaces.

The output devices 610 can allow information to be viewed or perceived in connection with execution of the instructions. The input device(s) 615 can allow a user to make manual adjustments, make selections, enter data or other information, or interact in any of a variety of manners with the processor during execution of the instructions.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, e.g., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from a content server of other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the content server.

The term "data processing apparatus" or "computing device" "module" "engine" or "computing device" encompasses apparatuses, devices, and machines for processing data, including by way of example a programmable processor, a computer, a system on a chip, or multiple ones, or combinations, of the foregoing. The apparatuses can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination thereof. The apparatus and execution environment can realize various different computing model infrastructures, such as web services, distributed computing and grid computing infrastructures. The interest identifier module 140 and the content matching module 135 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 600 can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While operations are depicted in the drawings in a particular order, this should not be understood as requiring that such operations be performed in the particular order shown or in sequential order, or that all illustrated operations are required to be performed. Actions described herein can be performed in a different order.

The separation of various system components does not require separation in all implementations, and the described program components can be into a single hardware or software product. For example, the interest identifier module 140 and the content matching module 135 can be a single module, a logic device having one or more processing circuits, or part of a search engine.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementation," "an alternate implementation," "various implementation," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of providing information via computer networked environments, comprising:
   receiving, by a processing system having one or more processors, via a computer network, from at least one of a first computing device or a second computing device, a first string including a plurality of terms and a content request operator, during a communication session between the first computing device and the second computing device via the computer network,
   the content request operator including a character;
   at least one term of the plurality of terms adjacent to the character in the first string;
   parsing, by the data processing system, the first string to identify the content request operator;
   determining, by the data processing system, responsive to identifying the content request operator, that the content request operator of the first string corresponds to a request for content;
   parsing, by the data processing system, responsive to determining that the first string corresponds to the request for content, the first string to identify the at least one term of the plurality of terms adjacent to the content request operator;
   determining, by the data processing system, that the at least one term of the plurality of terms is similar to at least one subject matter keyword;
   selecting, by the data processing system, a content item of a content provider computing device, responsive to determining that the at least one term of the plurality of terms is similar to the at least one subject matter keyword, the content item corresponding to the at least one subject matter keyword;
   removing, by the data processing system, the content request operator from the first string to generate a second string without the content request operator;
   transmitting, by the data processing system, via the computer network the second string without the content request operator to the second computing device in the communication session with the first computing device; and
   transmitting, by the data processing system via the computer network, the content item for display on the first computing device responsive to selecting the content item.

2. The method of claim 1, wherein the content request operator is one of a plurality of content request operators, and wherein the content item includes a first content item, and comprising:
   obtaining, by the data processing system, a second string from the first computing device;
   determining, by the data processing system, the second string lacks any of the plurality of content request operators; and
   preventing, by the data processing system, transmission of a second content item for rendering by the first computing device.

3. The method of claim 1, wherein the string includes a plurality of terms, and comprising:
   identifying, by the data processing system, a first subset of terms of the plurality of terms as corresponding to the content request operator, wherein a second subset of terms of the plurality of terms includes all remaining terms of the plurality of terms, and wherein all terms of the second subset of terms do not correspond to the content request operator; and
   selecting, by the data processing system, the content item using the first subset of terms as keywords and not using the second subset of terms.

4. The method of claim 1, comprising:
   providing, by the data processing system, a prompt for display by the first computing device during entry of the first string into an interface of an online document, the prompt including the content request operator configured for insertion into the first string.

5. The method of claim 1, comprising:
   determining, by the data processing system from the content request operator, at least one of a time criterion, a location criterion, and a cost criterion; and
   selecting the content item, the at least one subject matter satisfying at least one of the time criterion, the location criterion, and the cost criterion.

6. The method of claim 1, comprising:
   providing, by the data processing system via the computer network, the content item for display by the first computing device during the communication session.

7. The method of claim 1, wherein the second computing device includes a social network server, comprising:
   obtaining, by the data processing system from one of the social network server and the first computing device via the computer network, the first string including the content request operator as a post to a web page.

8. The method of claim 1, wherein the second computing device includes a first content publisher computing device, comprising:
   providing, by the data processing system via the computer network, the content item for display by the first computing device during a second communication session between the first computing device and the second computing device.

9. The method of claim 1, wherein the content request operator is not a word and includes at least one of a text character of the string and a symbol of the string appended to the at least one term.

10. A system of providing information via computer networked environment, comprising:
  a data processing system comprising one or more processors and one or more storage devices storing instructions that when executed by the one or more processors, cause the one or more processors to perform operations comprising:
  receiving, via a computer network, from at least one of a first computing device or a second computing device, a first string including a plurality of terms and a content request operator, during a communication session between the first computing device and the second computing device via the computer network, the content request operator including a character, at least one term of the plurality of terms adjacent to the character in the first string;
  parsing the first string to identify the content request operator;
  determining, responsive to identifying the content request operator that the content request operator of the first string corresponds to a request for content;
  parsing, responsive to determining that the first string corresponds to the request for content, the first string to identifying at least one term of the plurality of terms adjacent to the content request operator;
  determining that the at least on term of the plurality of terms is similar to at least one subject matter keyword;
  selecting a content item of a content provider computing device, responsive to the determining that the at least one term of the plurality of terms is similar to the at least one subject matter keyword, the content item corresponding to the at least one subject matter keyword;
  removing the content request operator from the first string to generate a second string without the content request operator;
  transmitting, via the computer network the second string without the content request operator to the second computing device in the communication session with the first computing device; and
  transmitting, via the computer network, the content item for display on the end-user first computing device responsive to selecting the content item.

11. The system of claim 10, wherein the content request operator includes one of a plurality of content request operators and the content item is a first content item, and wherein the instructions that when executed by the one or more processors, cause the one or more processors to perform the operations comprising:
  obtaining a second string from the first computing device;
  determining the second string lacks any of the plurality of content request operators; and
  preventing transmission of a second content item for rendering by the first computing device.

12. A non-transitory computer readable storage medium device storing instructions that when executed by one or more processors, cause the one or more processors to perform operations comprising:
  receiving, via a computer network, from at least one of a first computing device or a second computing device, a first string including a plurality of terms and a content request operator from a communication session between the first computing device and the second computing device, the content request operator including a character, the at least one term adjacent to the character;
  parsing the first string to identify the content request operator;
  determining, responsive to identifying the content request operator, that the content request operator of the first string corresponds to a request for content;
  parsing, responsive to determining that the first string corresponds to the request for content, the first string to identify at least one term of the plurality of terms adjacent to the content request operator;
  determining that the at least one term of the plurality of terms is similar to at least one subject matter keyword;
  selecting a content item of a content provider computing device, responsive to determining that the at least one term of the plurality of terms is similar to the at least one subject matter keyword, the content item corresponding to the at least one subject matter keyword;
  removing the content request operator from the first string to generate a second string without the content request operator;
  transmitting, via the computer network the second string without the content request operator to the second computing device in the communication session with the first computing device; and
  transmitting, via the computer network, the content item for display on the first end user computing device responsive to selecting the content item.

13. The non-transitory computer readable storage medium device of claim 12, wherein the content request operator is one of a plurality of content request operators and the content item includes a first content item, and wherein the instructions that when executed by the one or more processors, cause the one or more processors to perform the operations comprising:
  obtaining a second query from the first computing device;
  determining the second string lacks any of the plurality of content request operators; and
  preventing transmission of a second content item for rendering by the first computing device.

14. The method of claim 1, comprising:
  inserting, by the data processing system, responsive to selecting the content item, the plurality of terms of the first string as text onto the content item; and
  wherein transmitting the content item further comprises transmitting the content item, responsive to inserting the plurality of terms into the content item.

15. The method of claim 1, wherein receiving the first string further comprises receiving the first string including a content constraint operator, the content constraint operator including a second character different from the character and adjacent to a second term of the plurality of terms; and comprising:
  parsing, by the data processing system, the first string to identify the content constraint operator;
  parsing, by the data processing system, the first string to identify the second term of the plurality of terms adjacent to the content constraint operator;
  generating, by the data processing system, using the second term and a type of the constraint operator, a content selection criterion to select, from the plurality of content items selected based on the at least one subject matter keyword, the content item that satisfies the content selection criterion; and wherein selecting the content item of the content provider computing device further comprises selecting the content item satisfying the content selection criterion.

* * * * *